US012673586B2

(12) United States Patent
Yamada et al.

(10) Patent No.: US 12,673,586 B2
(45) Date of Patent: Jul. 7, 2026

(54) SEAT CONTROL DEVICE, STORAGE MEDIUM STORING COMPUTER PROGRAM FOR CONTROLLING SEAT AND METHOD FOR CONTROLLING SEAT

(71) Applicant: TOYOTA JIDOSHA KABUSHIKI KAISHA, Toyota (JP)

(72) Inventors: Kenta Yamada, Shinagawa-ku (JP); Hiroshi Morimoto, Ota-ku (JP); Udara Eshan Manawadu, Edogawa-ku (JP); Takuhiro Omi, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 85 days.

(21) Appl. No.: 18/507,449

(22) Filed: Nov. 13, 2023

(65) Prior Publication Data

US 2024/0246457 A1 Jul. 25, 2024

(30) Foreign Application Priority Data

Jan. 20, 2023 (JP) ................................. 2023-007307

(51) Int. Cl.
B60N 2/02 (2006.01)
B60N 2/00 (2006.01)

(52) U.S. Cl.
CPC ........... B60N 2/0278 (2023.08); B60N 2/002 (2013.01); B60N 2/0224 (2013.01);
(Continued)

(58) Field of Classification Search
CPC .... B60N 2/002; B60N 2/0224; B60N 2/0244;
B60N 2/0248; B60N 2/0268; B60N 2/0278; B60N 2/04; B60N 2/20; B60N 2/22; B60N 2/90; B60N 2210/24; B60W 40/08; B60W 50/14; B60W 60/0051; B60W 60/0053;
(Continued)

(56) References Cited

U.S. PATENT DOCUMENTS

2016/0159251 A1* 6/2016 Ebina ................... B60N 2/0025
701/49
2016/0264021 A1* 9/2016 Gillett ...................... B60L 8/00
(Continued)

FOREIGN PATENT DOCUMENTS

DE 4226747 C1 * 12/1993 ............. B60K 28/00
JP 2016-168972 A 9/2016
(Continued)

*Primary Examiner* — John M Zaleskas
(74) *Attorney, Agent, or Firm* — Sughrue Mion, PLLC

(57) ABSTRACT

A seat control device has a processor configured to determine whether a control transfer demand for transferring driving of a vehicle from a manual control operation to an automatic control operation or from the manual control operation to the automatic control operation has been made, determine whether a seat position of a seat on which a driver is seated is in a displaceable state based on information representing a state of the driver, and displace the seat position from a position for the automatic control operation to a position for the manual control operation or from the position for the manual control operation to the position for the automatic control operation using a seat drive unit when the control transfer demand has been made and the seat position is in the displaceable state.

17 Claims, 6 Drawing Sheets

(52) U.S. Cl.
   CPC ......... *B60N 2/0244* (2013.01); *B60N 2/0248* (2013.01); *B60N 2/0268* (2023.08); *B60N 2210/24* (2023.08)

(58) Field of Classification Search
   CPC .. B60W 2540/223; G05D 1/0061; G05D 1/81
   See application file for complete search history.

(56) References Cited

U.S. PATENT DOCUMENTS

| | | | | |
|---|---|---|---|---|
| 2017/0028876 | A1* | 2/2017 | Yamada | B60N 2/01 |
| 2017/0028987 | A1* | 2/2017 | Yamada | B60N 2/0022 |
| 2017/0144568 | A1* | 5/2017 | Torii | B60N 2/0244 |
| 2017/0217335 | A1* | 8/2017 | Tominaga | B60N 2/0252 |
| 2017/0267124 | A1* | 9/2017 | Numazawa | B60N 2/01 |
| 2017/0313314 | A1* | 11/2017 | Sen | B60W 50/082 |
| 2017/0334451 | A1* | 11/2017 | Asakura | B60W 10/04 |
| 2018/0029501 | A1* | 2/2018 | Wolf | B60N 2/06 |
| 2018/0056816 | A1* | 3/2018 | Kim | B60N 2/0277 |
| 2018/0072188 | A1* | 3/2018 | Yamada | B60N 2/012 |
| 2018/0229740 | A1* | 8/2018 | Matsumoto | G06V 20/56 |
| 2018/0281623 | A1* | 10/2018 | Matsumoto | B60N 2/0244 |
| 2018/0281624 | A1* | 10/2018 | Nagasawa | G05D 1/0061 |
| 2019/0217796 | A1* | 7/2019 | Takamatsu | B60N 2/0228 |
| 2019/0225184 | A1* | 7/2019 | Ohno | B60N 2/0252 |
| 2019/0283629 | A1* | 9/2019 | Kobayashi | B60N 2/0277 |
| 2020/0047770 | A1* | 2/2020 | Ozawa | B60N 2/838 |
| 2020/0079255 | A1* | 3/2020 | Ohno | B60N 2/42745 |
| 2020/0086764 | A1* | 3/2020 | Mimura | B60W 10/20 |
| 2020/0101977 | A1* | 4/2020 | Nakai | B60K 35/10 |
| 2020/0130546 | A1* | 4/2020 | Foltin | B60N 2/6673 |
| 2020/0324669 | A1* | 10/2020 | Amakawa | B60N 2/04 |
| 2021/0053590 | A1* | 2/2021 | Namba | B60W 60/0051 |
| 2021/0188324 | A1* | 6/2021 | Kim | B60W 60/0051 |
| 2021/0206393 | A1* | 7/2021 | Yang | B60N 2/0272 |
| 2022/0032944 | A1* | 2/2022 | Homma | B60W 40/08 |
| 2022/0169288 | A1* | 6/2022 | Kim | B62D 1/183 |
| 2022/0219570 | A1* | 7/2022 | Ohno | B60N 2/01 |
| 2023/0013883 | A1* | 1/2023 | Ozawa | G05D 1/0088 |
| 2023/0068393 | A1* | 3/2023 | Hannig | B60N 2/0278 |
| 2023/0166638 | A1* | 6/2023 | Kotani | B60W 50/16 701/49 |
| 2023/0415614 | A1* | 12/2023 | Ito | B60N 2/882 |
| 2024/0025429 | A1* | 1/2024 | Ozawa | B60N 2/0022 |
| 2024/0034324 | A1* | 2/2024 | Homma | B62D 6/007 |
| 2024/0051586 | A1* | 2/2024 | Kim | B60W 60/0053 |
| 2024/0067054 | A1* | 2/2024 | Omi | B60W 60/005 |
| 2024/0083308 | A1* | 3/2024 | Kume | B60N 2/22 |
| 2024/0336269 | A1* | 10/2024 | Omi | G06V 40/174 |
| 2024/0396122 | A1* | 11/2024 | Tanabe | B60N 2/16 |

FOREIGN PATENT DOCUMENTS

| | | | |
|---|---|---|---|
| JP | 2017-024653 | A | 2/2017 |
| JP | 2017-136898 | A | 8/2017 |
| JP | 2018-167626 | A | 11/2018 |
| JP | 2022-30769 | A | 2/2022 |
| JP | 2022-147750 | A | 10/2022 |
| JP | 2022-185937 | A | 12/2022 |

* cited by examiner

POSITION SETTING
PROCESSING

S101

SET MANUAL CONTROL POSITION

S102

SET AUTOMATIC CONTROL POSITION

END

SEAT CONTROL PROCESSING

S201

CONTROL TRANSFER DEMAND
?

No

Yes

S202

ACQUIRE INFORMATION REPRESENTING
STATE OF DRIVER AND STATE OF REAR SEA

S203

IS SEAT
POSITION OF DRIVING SEAT IN
DISPLACEABLE STATE
?

No

Yes          S204

DISPLACE SEAT POSITION

S205

NOTIFY
TO DISPLACE
SEAT POSITION

END

FIG. 6

| STATE OF DRIVER |
| --- |
| HOLDING OBJECT IN HAND |
| PLACING OBJECT ON LAP |
| HOLDING GLASSES IN HAND |
| TAKING OFF SHOES |
| DRAWING KNEES UP |
| HOLDING GARMENT IN HAND |
| OPERATING INFORMATION TERMINAL |

FIG. 7

| STATE OF DRIVER/STATE OF REAR SEAT |
| --- |
| HOLDING OBJECT IN HAND |
| OBJECT BEING PLACED BETWEEN DRIVING SEAT AND REAR SEAT |
| PERSON SEATING IN REAR SEAT |

SEAT CONTROL DEVICE, STORAGE MEDIUM STORING COMPUTER PROGRAM FOR CONTROLLING SEAT AND METHOD FOR CONTROLLING SEAT

FIELD

The present disclosure relates to a seat control device, storage medium storing a computer program for controlling a seat and method for controlling a seat.

BACKGROUND

An automatic control system mounted on a vehicle does not require a driver to be in a state in which the driver operates the vehicle all times, when the primarily controller of driving of the vehicle is the automatic control system.

Therefore, the automatic control system allows a seat position of a driving seat to be moved from a position for a manual control operation in which the driver can operate the vehicle manually to a position for an automatic control operation so that the driver can take a relaxed posture.

The automatic control system requests the driver to transfer the primarily controller of driving of the vehicle from the automatic control system to the driver (Transition Demand or Take Over Request) in the case that it is determined that the vehicle cannot be safely operated by the automatic control when the primarily controller of driving of the vehicle is the automatic control system. (See for example, Japanese Unexamined Patent Publication No. 2018-167626)

It is proposed that the seat position of the driving seat on which the driver is seated is also displaced from the position for the automatic control operation to the position for the manual control operation when the automatic control system transfers the primarily controller of driving of the vehicle from the automatic control system to the driver. This reduces the burden on the driver.

SUMMARY

However, there is a risk that a drink may be spilled due to displacement of the seat position when the driver is holding a drink in his/her hand, when the automatic control system displaces the seat position of the driving seat from the position for the automatic control operation to the position for the manual control operation at the time of the transition of the primarily controller of driving of the vehicle. In addition, when a laptop computer is placed on the lap of the driver, displacing the seat position might cause the laptop computer to come in contact with the steering.

Similarly, there is a risk that the drink may be spilled due to the displacement of the seat position when the driver is holding the drink in his hand, when the automatic control system displaces the seat position of the driving seat from the position for the manual control operation to the position for the automatic control operation at the time of the transition of the primarily controller of driving of the vehicle. Further, when a person is seated in the rear seat of the driving seat, the driving seat may come in contact with the person seated in the rear seat due to displacement of the seat position of the driving seat to the position for the automatic control operation.

Some drivers do not want immediate displacement of the seat position of the driving seat at the time of transition of the primarily controller of driving of the vehicle.

It is an object of the present disclosure to provide a seat control device which displaces the seat position of the driving seat after determining that the seat position of the driving seat is in the displaceable state, based on the information representing the state of the driver when the control transfer demand has been made.

According to one embodiment, a seat control device is provided. The seat control device has a processor configured to determine whether a control transfer demand for transferring driving of a vehicle from a manual control operation to an automatic control operation or from the manual control operation to the automatic control operation has been made, determine whether a seat position of a seat on which a driver is seated is in a displaceable state based on information representing a state of the driver, and displace the seat position from a position for the automatic control operation to a position for the manual control operation or from the position for the manual control operation to the position for the automatic control operation using a seat drive unit when the control transfer demand has been made and the seat position is in the displaceable state.

In the seat control device, it is preferable that the processor is further configured to determine whether the seat position is in the displaceable state based on an image including the driver.

In the seat control device, it is preferable that the processor is further configured to determine whether the seat position is in the displaceable state based on a communication state of an information terminal operated by the driver.

In the seat control device, it is preferable that the processor is further configured to determine whether the seat position is in the displaceable state based on information representing a state of another seat behind the seat on which the driver is seated.

In the seat control device, it is preferable that the processor is further configured to notify the driver to displace the seat position from the position for the automatic control operation to the position for the manual control operation or from the position for the manual control operation to the position for the automatic control operation using a notifying unit when the control transfer demand has been made and the seat position is not in the displaceable state.

In the seat control device, it is preferable that the processor is further configured to identify a release operation based on the information representing a state of the driver when the control transfer demand has been made and the seat position is not in the displaceable state, and notify the driver to operate the release operation.

According to another embodiment, a storage medium storing a computer program for controlling a seat is provided. The computer program causes a processor to execute a process, and the process includes determining whether a control transfer demand for transferring driving of a vehicle from a manual control operation to an automatic control operation or from the manual control operation to the automatic control operation has been made, determine whether a seat position of a seat on which a driver is seated is in a displaceable state based on information representing a state of the driver, and displace the seat position from a position for the automatic control operation to a position for the manual control operation or from the position for the manual control operation to the position for the automatic control operation using a seat drive unit when the control transfer demand has been made and the seat position is in the displaceable state.

According to yet another embodiment of the invention there is provided a method for controlling a seat. The method for controlling a seat is carried out by a seat control device and the method includes determining whether a control transfer demand for transferring driving of a vehicle from a manual control operation to an automatic control operation or from the manual control operation to the automatic control operation has been made, determine whether a seat position of a seat on which a driver is seated is in a displaceable state based on information representing a state of the driver, and displace the seat position from a position for the automatic control operation to a position for the manual control operation or from the position for the manual control operation to the position for the automatic control operation using a seat drive unit when the control transfer demand has been made and the seat position is in the displaceable state.

The disclosed seat control device herein is capable of displacing the seat position of the driving seat after determining that the seat position of the driving seat is in the displaceable state based on the information representing the state of the driver when the control transfer demand has been made. Thus, the seat control device can reduce the burden on the driver and prevent the seat position of the driving seat from being displaced when the driver does not want.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

BRIEF DESCRIPTION OF DRAWINGS

FIG. 6 is a diagram illustrating states of the driver to be determined at the time of the transition of the primarily controller of driving of the vehicle from the automatic control device to the driver.

FIG. 7 is a diagram illustrating states of the driver and state of the rear seat to be determined at the time of the transition of the primarily controller of driving of the vehicle from the driver to the automatic control device.

DESCRIPTION OF EMBODIMENTS

FIG. 1A, FIG. 1B, FIG. 2A and FIG. 2B are diagrams for explaining the outlines of the operation of the seat control device of the present embodiment.

Figure 1A:
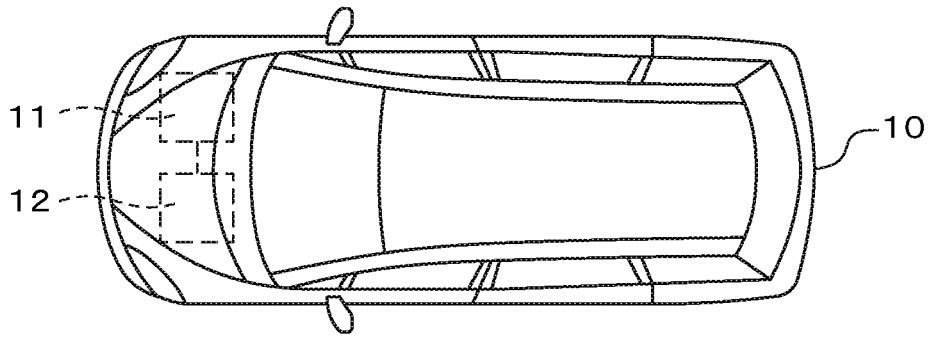
FIG. 1A is a diagram illustrating the outline of operation of a seat control device of the present embodiment and showing a vehicle.

FIG. 1A shows a vehicle 10 and the vehicle 10 has an automatic control device 11 and a seat control device 12. In an automatic control mode in which the automatic control device 11 is the primarily controller of driving of the vehicle 10, the automatic control device 11 drives the vehicle 10. In a manual control mode in which the driver 40 is the primarily controller of driving of the vehicle 10, the automatic control device 11 controls the operation of the vehicle 10 based on the operation of the driver 40.

Figure 1B:
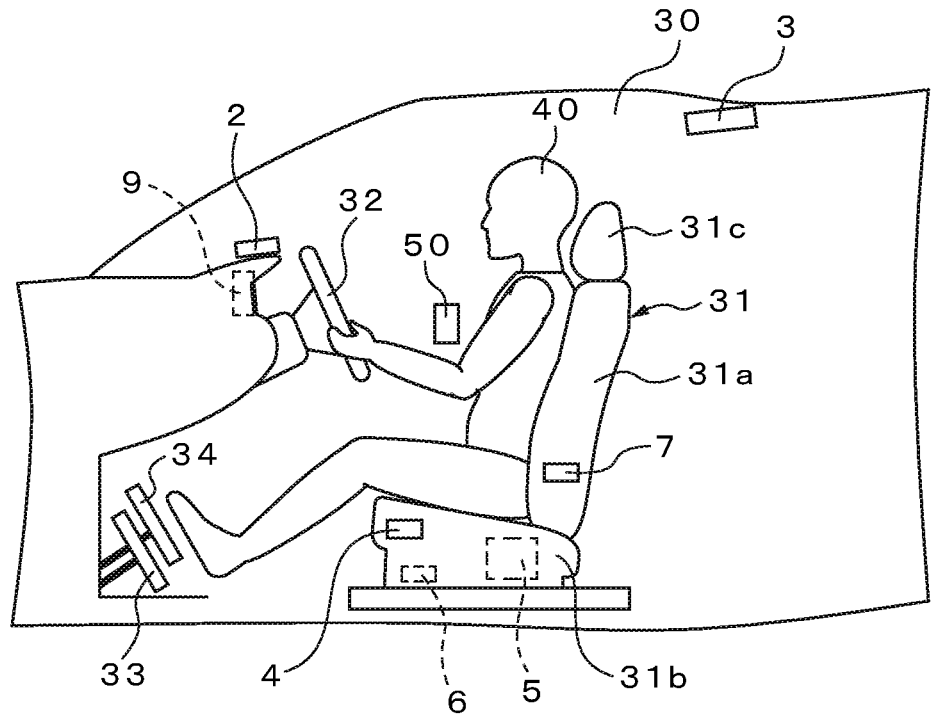
FIG. 1B is a diagram illustrating the outline of operation of the seat control device of the present embodiment and showing an example of a driving seat in a manual control position.

FIG. 1B is a diagram showing the driving seat 31 in the manual control position. The seat control device 12 sets the manual control position representing the seat position of the driving seat 31 when the driver 40 drives the vehicle 10 under the manual control mode in response to the operation of the seat operation unit 4 by the driver 40. The manual control position represents the seat position of the driving seat 31 for the manual control operation.

Figure 2A:
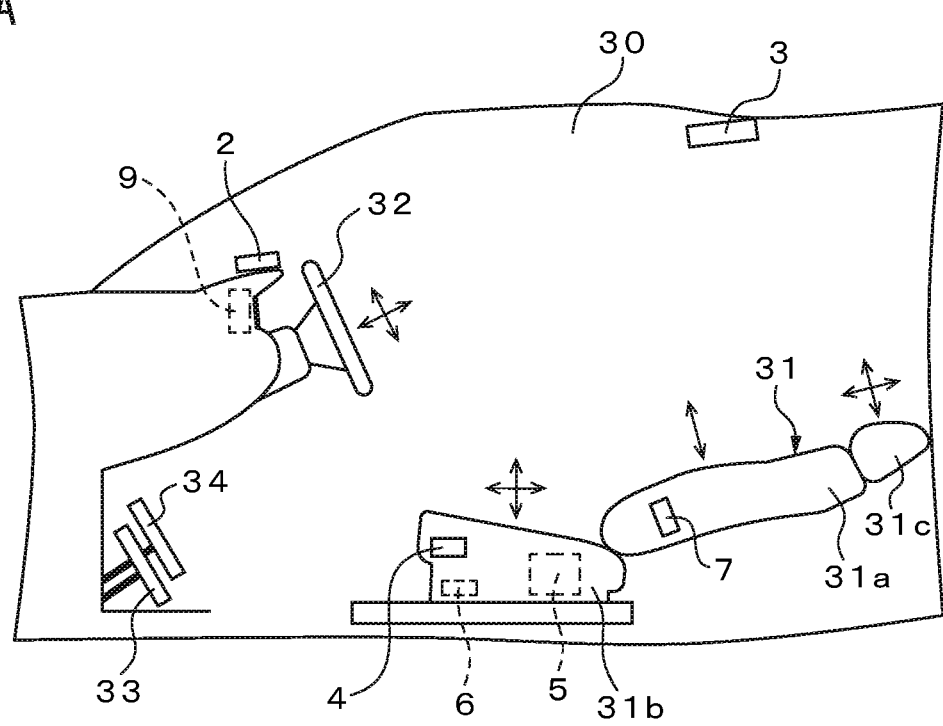
FIG. 2A is a diagram illustrating the outline of operation of the seat control device of the present embodiment and showing an example of a driving seat in an automatic control position.

The driving seat 31 has a seat back 31a, a seat cushion 31b, and a headrest 31c. As shown in FIG. 2A, the tilt angle of the seat back 31a is discretely displaceable in the ten levels. Each of the front-back direction and up-down direction positions of the seat cushion 31b is discretely displaceable in the ten levels. Each of the tilt and up-down direction position of the headrest 31c is discretely displaceable in the ten levels. In this specification, the seat position of the driving seat 31 is meant to include tilt (tilt angle) and position of each part of the driving seat 31.

The driver 40 sits on the driving seat 31 at the manual control position to be operable with the steering wheel 32, the brake pedal 33 and the accelerator pedal 34.

Figure 2B:
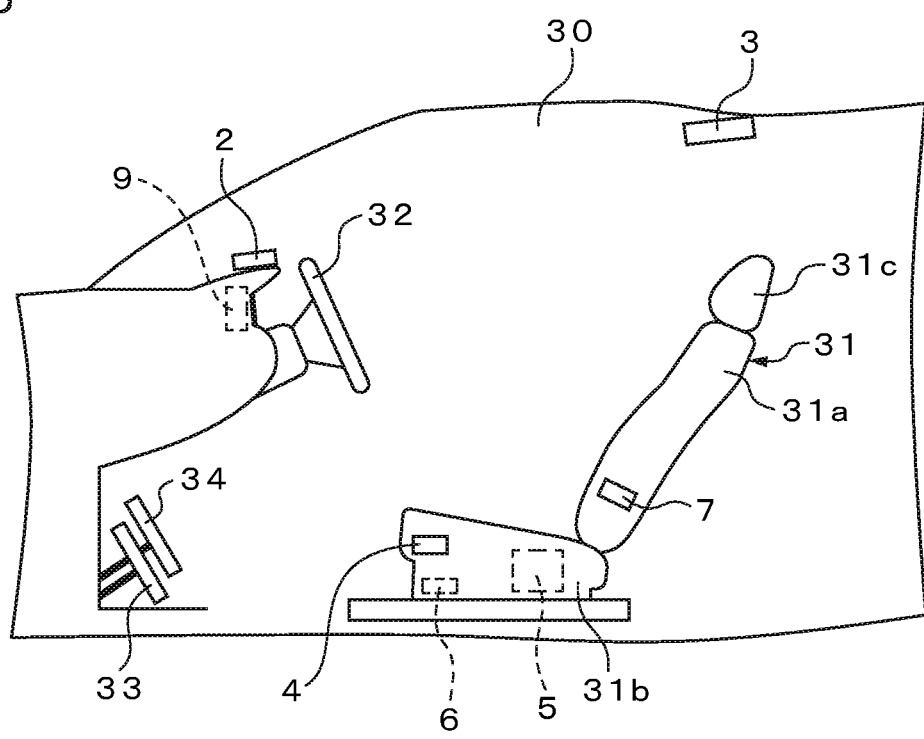
FIG. 2B is a diagram illustrating the outline of operation of the seat control device of the present embodiment and showing another example of a driving seat in an automatic control position.

FIG. 2A is a diagram showing an example of the driving seat 31 in the automatic control position. FIG. 2B is a diagram showing another example of the driving seat 31 in the automatic control position. The seat control device 12 sets the automatic control position representing the seat position of the driving seat 31 under the automatic control mode in response to the operation of the seat operation unit 4 by the driver 40. The automatic control position represents the seat position of the driving seat 31 for the automatic control operation.

In the example shown in FIG. 2A, the driver 40 is displacing the driving seat 31 rearwardly to expand the foot space and sits on the driving seat 31 in a laid-down position with the driving seat 31 greatly tending to the rear. Further, in the example shown in FIG. 2B, the driver 40 can sit on the driving seat 31 in a more extended foot space and in a more laid-down position than in the manual control position.

The automatic control device 11 notifies the control transfer demand requesting for transferring the primarily controller of the vehicle 10 from the automatic control device 11 to the driver 40 even when the operation of the vehicle 10 is under the automatic control mode, when it is determined that the vehicle 10 cannot be operated safely by the automatic control. The automatic control device 11 carries out the transfer of the control of the vehicle 10 to the driver 40 within a predetermined control transition time from the time of generating the control transfer demand.

When a control transfer demand has been made, the seat control device 12 determines whether the seat position of the driving seat 31 on which the driver 40 is seated is in a displaceable state based on the monitor images including the driver captured by the first camera 2 and/or the second camera 3.

When it is determined that the driver 40 is not holding a drink in his/her hand or the like, based on the monitor images, the seat control device 12 determines that the seat position of the driving seat 31 where the driver 40 is seated is in the displaceable state.

The seat control device 12 then uses a seat drive unit 5 to displace the seat position of the driving seat 31 from the automatic control position to the manual control position. Thus, the driver 40 can start the manual operation.

On the other hand, for example, when it is determined that the driver 40 is holding a drink in the hand based on the monitor image, the seat control device 12 determines that the seat position of the driving seat 31 on which the driver 40 is seated is not in the displaceable state.

This is because the driver 40 may spill the drink as the driving seat 31 moves from the automatic control position to the manual control position when the driver 40 is holding the drink in the hand.

The seat control device 12 then notifies the driver 40, via a user interface (UI) 9, to displace the seat position of the driving seat 31 from the automatic control position to the manual control position using the position operation unit 7.

The driver 40 operates the position operation unit 7 to displace the seat position of the driving seat 31 from the automatic control position to the manual control position upon placing the drink in a cup holder (not shown) or the like. This allows the driver 40 to displace the seat position of the driving seat 31 without spilling the drink.

Similarly, when the speed of the vehicle 10 becomes equal to or less than the predetermined reference speed, the automatic control device 11 notifies the driver, via the UI 9, of the control transfer demand to ask the driver 40 to transfer the primarily controller of driving of the vehicle 10 from the driver 40 to the automatic control device 11.

When the control transfer demand has been made, the seat control device 12 determines whether the seat position of the driving seat 31 on which the driver 40 is seated is in the displaceable state based on the monitor image including the driver 40 captured by the first camera 2 and/or the second camera 3.

When it is determined that the driver 40 is not holding a drink in his/her hand or the like, based on the monitor image, the seat control device 12 determines that the seat position of the driving seat 31 where the driver 40 is seated is in the displaceable state.

The seat control device 12 then uses the seat drive unit 5 to displace the seat position of the driving seat 31 from the manual control position to the automatic control position. The driver 40 can sit on the driving seat 31 in a relaxed posture.

On the other hand, for example, when it is determined that the driver 40 is holding a drink in the hand based on the monitor image, the seat control device 12 determines that the seat position of the driving seat 31 on which the driver 40 is seated is not in the displaceable state.

The seat control device 12 then notifies the driver 40, via the UI 9, to displace the seat position of the driving seat 31 from the manual control position to the automatic control position using the position operation unit 7.

The driver 40 operates the position operation unit 7 to displace the seat position of the driving seat 31 from the manual control position to the automatic control position, avoiding spillage of the drink in the hand.

As described above, the seat control device 12 of the present embodiment is capable of displacing the seat position of the driving seat 31 after determining that the seat position of the driving seat is in the displaceable state based on the information representing the state of the driver 40 when the control transfer demand has been made. Thus, the seat control device 12 can reduce the burden on the driver 40 and prevent the seat position of the driving seat 31 from being displaced when the driver 40 does not want.

Figure 3:
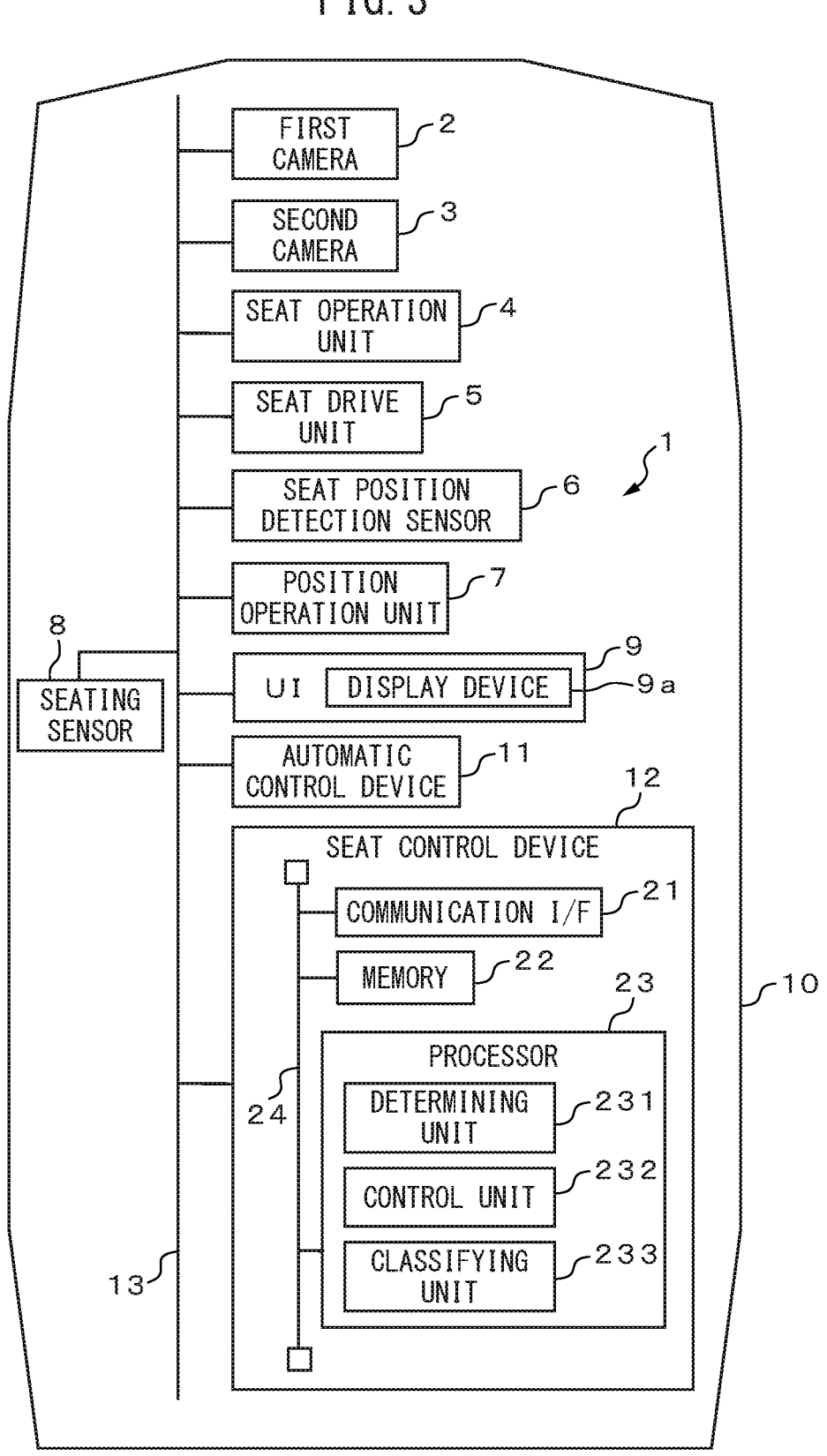
FIG. 3 is a general schematic diagram of a vehicle in which a seat control system including the seat control device of present embodiment is mounted.

FIG. 3 is a general schematic diagram of the vehicle 10 in which a seat control system 1 including the seat control device 10 of present embodiment is mounted. The seat control system 1 has the first camera 2, the second camera 3, the seat operation unit 4, the seat drive unit 5, a seat position detection sensor 6, the position operation unit 7, a seating sensor 8, the user interface (UI) 9, the automatic control device 11 and the seat control device 12, etc.

The first camera 2, the second camera 3, the seat operation unit 4, the seat drive unit 5, the seat position detection sensor 6, the position operation unit 7, the seating sensor 8, the UI 9, the automatic control device 11, and the seat control device 12 are communicatively connected through an in-vehicle network 13 conforming to the Controller Area Network standard.

The first camera 2 and the second camera 3 are disposed within the cabin 30 to be capable of capturing monitor images including driver 40 seated in the driving seat 31. Each of the first camera 2 and the second camera 3 is an exemplary image capturing unit. The monitor image is an example of information representing the state of the driver. The first camera 2 is located in front of the driving seat 31 so as to be able to capture the monitor images including the driver 40 when the seat position of the driving seat 31 is mainly in the manual control position. The first camera 2 can capture the monitor images including the driver 40 well when the driving seat 31 is in the seat position as shown in FIG. 1B or FIG. 2B. The second camera 3 is located above the driving seat 31 so as to be able to capture monitor images including driver 40 when the seat position of the driving seat 31 is mainly in the automatic control position. The second camera 3 can capture the monitor images including the driver 40 well when the driving seat 31 is in the seat position as shown in FIG. 2A. Further, the second camera 3 is preferably arranged to be capable of capturing monitor images including the rear seat (not shown) behind of the driving seat 31. The monitor image including the rear seat behind of the driving seat 31 is an exemplary of information representing a state of another seat behind the seat on which the driver is seated.

The first camera 2 and the second camera 3 captures monitoring images representing the periphery of the driving seat 31 at a monitoring image capturing time having a predetermined period, for example. Each of the first camera 2 and the second camera 3 has a 2D detector composed of an array of photoelectric conversion elements with infrared sensitivity, such as a CCD or C-MOS, and an imaging optical system that forms an image of the imaging region on the 2D detector. The first camera 2 and the second camera 3 transmit the captured monitor images to the seat control device 12 through the in-vehicle network 13. The monitor images are used by the seat control device 12 to determine the state of the driver and/or the state of the rear seat.

The seat operation unit 4 is operated by the driver 40 to output an operating signal representing a position of the driving seat 31 to be displaced to the seat control device 12. The seat control device 12 generates a driving signal for displacing the seat position of the driving seat 31 based on the operating signal, and output the driving signal to the seat drive unit 5. The seat drive unit 5 displaces the driving seat 31 based on the driving signal. The seat operation unit 4 has switches to operate each of the seat back 31*a*, seat cushion 31*b* and headrest 31*c*.

The seat drive unit 5 includes a drive device, such as a motor, for displacing the seat back 31*a*, seat cushion 31*b* or headrest 31*c*. In a FIG. 1B, etc., the seat drive unit 5 is arranged in the seat cushion 31*b*, but the seat drive unit may be arranged in a distributed manner on each of the seat back 31*a*, seat cushion 31*b* and headrest 31*c*.

The seat position detection sensor 6 detects the tilt or position of each part of the driving seat 31. The seat position detection sensor 6 detects the tilt of the seat back 31*a* and outputs tilt information representing the tilt of the seat back 31*a* to the seat control device 12. The seat position detection sensor 6 also detects the position of the front-back direction and the position of the up-down direction of the seat cushion 31*b*. The seat position detection sensor 6 outputs position information representing the position of the front-back direction and the position of the up-down direction of the seat cushion 31*b* to the seat control device 12. In addition, the seat position detection sensor 6 detects the tilt and up-down direction position of the headrest 31*c*. The seat position detection sensor 6 outputs tilt information representing the tilt of headrest 31*c* and position information representing the position of the up-down direction of headrest 31*c* to the seat control device 12.

The seat position detection sensor 6 may include a sensor that detects the tilt or position of seat back 31*a*, seat cushion 31*b* and headrest 31*c* mechanically, optically, or magnetically. In FIG. 1B, etc., the seat position detection sensor 6 is arranged in the seat cushion 31*b*. The seat position detection sensor 6 may be distributed in each of the seat cushion 31*b* and headrest 31*c*.

The position operation unit 7 is operated by the driver 40 and outputs a position operation signal representing the operation of the driver 40 to the seat control device 12. When the seat position of the driving seat 31 is in the manual control position, the driver 40 can operates the position operation unit 7 to displace the driving seat 31 to the automatic control position. Also, when the seat position of the driving seat 31 is in the automatic control position, the driver 40 can operate the position operation unit 7 to displace the driving seat 31 to the manual control position. When the position operating signal is input from the position operation unit 7, the seat control device 12 outputs a driving signal for displacing the seat position of the driving seat 31 to the manual control position or the automatic control position to the seat drive unit 5 according to the current seat position of the driving seat 31.

The seating sensor 8 is arranged in the rear seat (not shown) behind of the driving seat 31. The seating sensor 8 detects the seating of a person in the rear seat and outputs a seating signal indicating that a person is seated through the in-vehicle network 13 to the seat control device 12. As the seating sensor 8, for example, a pressure-sensitive sensor can be used. The pressure-sensitive sensor outputs the seating signal (output signal) when detecting a pressure equal to or greater than a predetermined reference pressure, and does not output the seating signal when detecting a pressure less than the reference pressure. The seating signal is an example of information representing a state of another seat behind the seat on which the driver 40 is seated.

The UI 9 is an exemplary notifying unit. The UI 9 is controlled by the automatic control device 11 or the seat control device 12 to notify the driver 40 of information regarding the vehicle 10, such as the control transfer demand. The UI 9 has a display device 11*a* such as a liquid crystal display or a touch panel for displaying the control transfer demand or the like. The UI 9 may also include a sound-output device (not shown) for notifying the driver 40 of the control transfer demand or the like. The UI 9 has, for example, a touch panel or an operation button as an input device for inputting operation information from the driver 40 to the vehicle 10. The UI 9 may have an audio input device (not shown) for inputting the voice of the driver 40. The UI 9 outputs the input operation information to the automatic control device 11 or the like through the in-vehicle network 13.

The automatic control device 11 controls the operation of the vehicle 10. The automatic control device 11 has an automatic control mode for driving the vehicle 10 automatically and a manual control mode for controlling the operation of the vehicle 10 based on the operation of the driver 40. The automatic control device 11 drives the vehicle 10 under the automatic control mode. The automatic control device 11 controls the operation of steering, driving, braking, etc., under the automatic control mode based on the detection information, etc., of the sensors (not shown) mounted on the vehicle 10.

The automatic control device 11 controls the operation of the vehicle 10 such as a steering, driving, braking based on the operation of the driver 40 under the manual control mode. The automatic control device 11 controls the operation of the vehicle 10 based on the operation of at least one of the steering wheel 32, the brake pedal 33, or the accelerator pedal 34 by the driver 40 under the manual control mode.

In the automatic control mode, the automatic control device 11 is the primarily controller of driving of the vehicle 10. The automatic control mode may include driving of so-called level 3 to 5 automatic driving levels. In the manual control mode, the driver 40 is the primarily controller of driving of the vehicle 10. The manual control mode may include driving of so-called level 0 to 2 automatic driving levels.

The automatic control device 11 detects an object such as another vehicle around the vehicle 10 based on the detection information of the sensors (not shown) mounted on the vehicle 10. When it is impossible to maintain a predetermined distance or more between the vehicle 10 and other object under the automatic control mode, the automatic control device 11 notifies the driver 40 via the UI 9 of the control transfer demand that requires to transfer the primarily controller of the vehicle 10 from the automatic control device 11 to the driver 40. In addition, under the automatic control mode, the automatic control device 11 notifies the driver 40 via the UI 9 of the control transfer demand requesting that the driving to be transferred from the automatic control device 11 to the driver 40 before entering an area where the driving under the automated control mode is not allowed. The areas where operation under the automatic control mode is not allowed include area without high-precision map. Further, under the automatic control mode, the automatic control device 11 notifies the driver 40 via the UI 9 of the control transfer demand even when it is determined that the driving of the vehicle 10 cannot be safely controlled due to an error such as a sensor or the like. The automatic control device 11 also outputs the control transfer demand to the seat control device 12 through the in-vehicle network 13.

The automatic control device 11 carries out the transition of the control of the vehicle 10 to transfer the control to the driver 40 within a predetermined control transition time from the time of notifying the control transfer demand to the driver 40. The driver 40 provides predetermined approval operation for the control transfer demand after the seat position of the driving seat 31 has been displaced to the manual control position. The automatic control device 11 starts operation of the manual control mode after confirming the approval operation. When the approval operation of the driver 40 to the control transfer demand cannot be confirmed within the control transition time, the automatic control device 11 safely stops the vehicle 10 (Minimal Risk Maneuver process).

Further, under the automatic control mode, the automatic control device 11 carries out the control transfer when the driver 40 requests the automatic control device 11 to transfer the primarily controller of driving of the vehicle 10 from the automatic control device 11 to the driver 40 via the UI 9. When the UI 9 inputs the control transfer demand, the UI 9 also outputs the control transfer demand to the seat control device 12 requesting to transfer the primarily controller of driving of the vehicle 10 from the automatic control device 11 to the driver 40 through the in-vehicle network 13.

Under the manual control mode, the automatic control device 11 notifies the driver 40 of the control transfer demand requesting that the primarily controller of driving of the vehicle 10 to be transferred from the driver 40 to the automatic control device 11 via the UI 9, when the speed of the vehicle 10 becomes equal to or less than the predetermined reference speed. The automatic control device 11 also provides the control transfer demand to the seat control device 12 through the in-vehicle network 13.

Under the manual control mode, the automatic control device 11 carries out the control transfer when the driver 40 requests the automatic control device 11 to transfer the primarily controller of driving of the vehicle 10 from the driver 40 to the automatic control device 11 via the UI 9. When the UI 9 inputs the control transfer demand, the UI 9 also outputs the control transfer demand to the seat control device 12 requesting to transfer the primarily controller of driving of the vehicle 10 from the driver 40 to the automatic control device 11 through the in-vehicle network 13.

The seat control device 12 displaces the seat position of the driving seat 31 based on the state of the driver 40 when the control transfer demand is input from the automatic control device 11 or the UI 9.

The seat control device 12 carries out a determination process, a control process, and a classifying process. For this purpose, the seat control device 12 has a communication interface (IF) 21, memory 22, and processor 23. The communication interface 21, the memory 22, and the processor 23 are connected through the signal wires 24. The communication interface 21 includes an interface circuitry for connecting the seat control device 12 with the in-vehicle network 13.

The memory 22 is an exemplary storage unit, and it has a volatile semiconductor memory and a non-volatile semiconductor memory, for example. The memory 22 stores application computer programs and various data to be used for information processing carried out by the processor 23.

All or some of the functions of the seat control device 12 are functional modules implemented, for example, by a computer program executed by the processor 23. The processor 23 has a determining unit 231, a control unit 232, and a classifying unit 233. Alternatively, the functional module of the processor 23 may be a dedicated arithmetic circuit provided in the processor 23. The processor 23 includes one or more CPUs (Central Processing Units) and its peripheral circuitries. The processor 23 may further include other operational circuitry, such as a logic unit, a numerical unit, or a graphic processing unit. The seat control device 12 is, for example, an electronic control unit (Electronic Control Unit: ECU). The detailed operation of the seat control device 12 will be described later.

In FIG. 3, the automatic control device 11 and the seat control device 12 are described as separate devices (e.g., Electronic Control Unit: ECU), but all of the devices may be configured as one device.

Figures 4, 5:
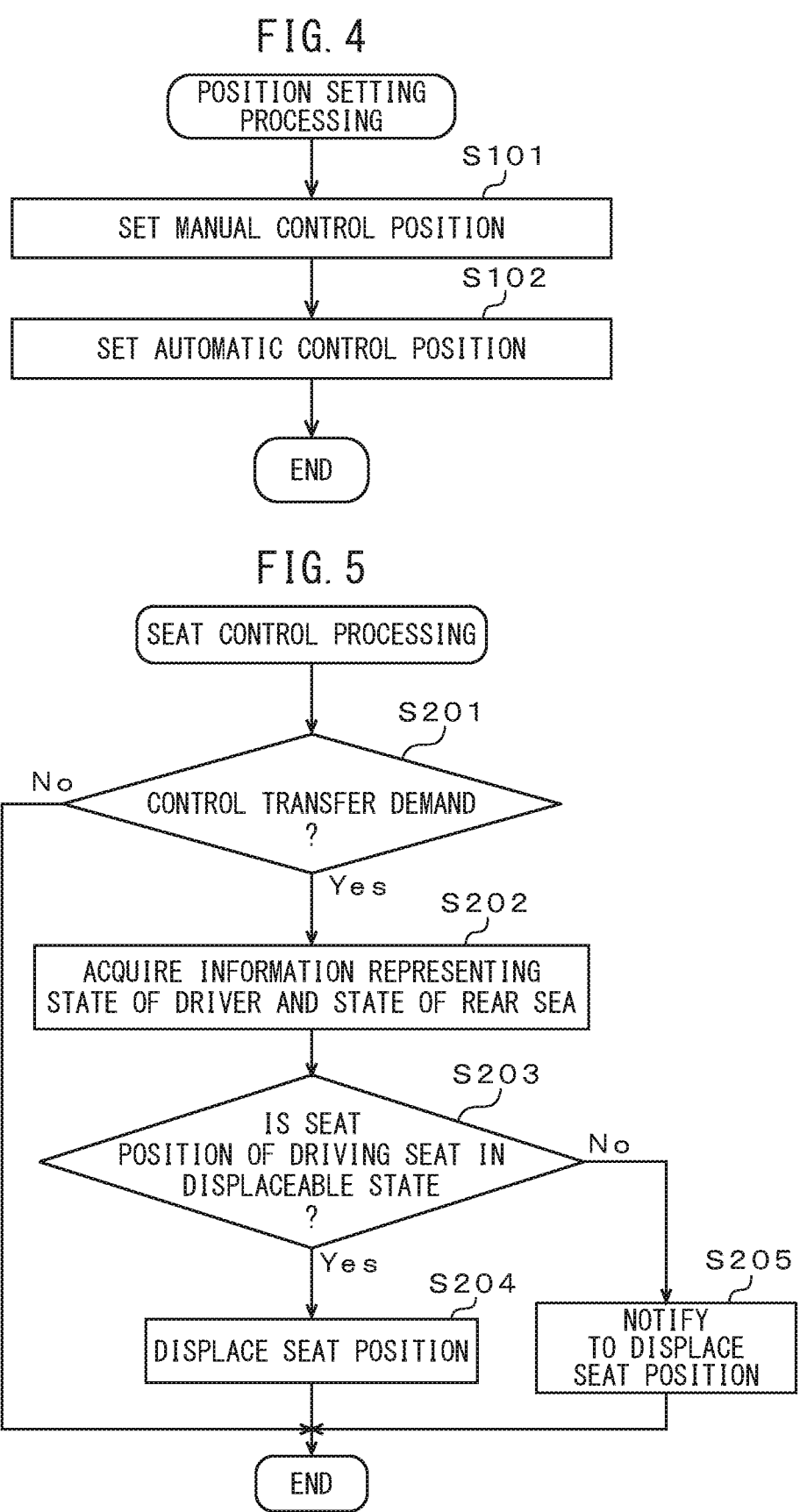
FIG. 4 is an example of an operation flow chart for a position setting processing of the seat control device of the present embodiment.
FIG. 5 is an example of an operation flow chart for a seat control processing of the seat control device of the present embodiment.

FIG. 4 is an example of an operation flow chart for a position setting processing of the seat control device 12 of the present embodiment. The position setting process shown in FIG. 4, for example, is carried out each time the seat control system 1 is activated.

First, the control unit 232 sets the manual control position of the driving seat 31 under the manual control mode (step S101). The driver 40 operates the seat operation unit 4 to adjust the tilt of the seat back 31a. The driver 40 also operates the seat operation unit 4 to adjust the position of the front-back direction and the up-down direction of the seat cushion 31b. The driver 40 also operates the seat operation unit 4 to adjust the tilt and the up-down direction position of the headrest 31c.

The control unit 232 also inputs the tilt information representing the tilt of the seat back 31a, the position information representing the positions of the front-back direction and up-down direction of the seat cushion 31b and the tilt information and the position information representing the tilt and the position of the up-down direction of the headrest 31c, detected by the seat position detection sensor 6. The control unit 232 stores these position and tilt information in the memory 22 as the manual control position of the driving seat 31. The manual control position of the driving seat 31 is represented by any one of the ten levels of the tilt of the seat back 31a, the positions of the front-back direction and up-down direction of the seat cushion 31b and the tilt and the position of the up-down direction of the headrest 31c. Thus, the control unit 232 sets the manual control position of the driving seat 31. The control unit 232 may also set the manual control position of the steering wheel 32, the brake pedal 33 and the accelerator pedal 34 under the manual control mode.

Next, the control unit 232 sets the automatic control position of the driving seat 31 under the automatic control mode, and the series of processing is complete (step S102). The driver 40 operates the seat operation unit 4 to adjust the tilt of the seat back 31a. The driver 40 also operates the seat operation unit 4 to adjust the position of the front-back direction and the up-down direction of the seat cushion 31b. The driver 40 also operates the seat operation unit 4 to adjust the tilt and the up-down direction position of the headrest 31c.

The control unit 232 also inputs the tilt information representing the tilt of the seat back 31a, the position information representing the positions of the front-back direction and up-down direction of the seat cushion 31b and the tilt information and the position information representing the tilt and the position of the up-down direction of the headrest 31c, detected by the seat position detection sensor 6. The control unit 232 stores these position and tilt information in the memory 22 as the automatic control position of the driving seat 31. The automatic control position of the driving seat 31 is represented by any one of the ten levels of the tilt of the seat back 31a, the positions of the front-back direction and up-down direction of the seat cushion 31b and the tilt and the position of the up-down direction of the headrest 31c. Thus, the control unit 232 sets the automatic control position of the driving seat 31.

FIG. 5 is an example of an operation flow chart for a seat control processing of the seat control device 12 of the present embodiment. The seat control processing shown in FIG. 5 is carried out at the seat control time having a predetermined period.

First, the determining unit 231 determines whether the control transfer demand for transferring driving of the vehicle 10 has been input from the automatic control device 11 or the UI 9 (step S201). The control transfer demand means a demand for transferring driving of a vehicle 10 from the manual control operation to the automatic control operation or from the manual control operation to the automatic control operation. When the control transfer demand has not been input (step S201—No), the series of processing is complete.

On the other hand, when the control transfer demand has been input (step S201—Yes), the determining unit 231 acquires information representing the state of the driver 40 and information representing the state of the rear seat behind of the driving seat 31 on which the driver 40 is seated (step S202). For example, the monitor images captured by the first camera 2 or the second camera 3 may be used as the information representing the state of the driver 40. The seating information may be used as the information representing the state of the rear seat.

Next, the determining unit 231 determines whether the seat position of the driving seat 31 on which the driver 40 is seated is in the displaceable state based on the information representing the state of the driver and the information representing the state of the rear seat behind the driving seat 31 (step S203). The determining unit 231 is an exemplary second determining unit.

FIG. 6 is a diagram illustrating states of the driver 40 to be determined at the time of the transition of the primarily controller of driving of the vehicle 10 from the automatic control device 11 to the driver 40. The determined states of the driver 40 may include the driver 40 holding an object (such as a drink, food, glasses, or cosmetics, etc.) in the hand; the driver 40 placing an object (such as a laptop computer, pet, or luggage, etc.) on the lap, the driver 40 holding the glasses in the hand, the driver 40 taking off the shoes, the driver 40 drawing the knees up, the driver 40 holding the garment in the hand, and the driver 40 operating the information terminal 50 such as a laptop computer or a high performance portable terminal.

FIG. 7 is a diagram illustrating states of the driver 40 and states of the rear seat to be determined at the time of the transition of the primarily controller of driving of the vehicle 10 from the driver 40 to the automatic control device 11. The determined states of the driver 40 may include the driver 40 holding an object (such as a drink, food, glasses, or cosmetics, etc.) in the hand. The determined states of the rear seat may include an object being placed between the driving seat 31 and the rear seat, and a person seating in the rear seat.

The determining unit 231 is configured to include a classifier trained to input the monitor image captured by the first camera 2 and the second camera 3 to identify a person holding a predetermined object in the hand, a person placing a predetermined object on the lap, a person in a predetermined posture, an object between the driving seat and the rear seat, and a person seating on the rear seat. The classifier inputs an image to identify a person holding a predetermined object in the hand, a person placing a predetermined object on the lap, a person in a predetermined posture, an object between the driving seat and the rear seat, and a person seating on the rear seat. Here, the person in the predetermined posture includes the person who is taking off the shoes, the person who is drawing the knees up, and the person who is operating an information terminal.

The classifier is, for example, a convolutional neural network (CNN) having a plurality of layers connected in series from an input side to an output side. The images including a person holding a predetermined object in the hand, a person placing a predetermined object on the lap, a person in a predetermined posture, an object between the driving seat and the rear seat, and a person seating on the rear seat are input to the CNN as the teacher data and the CNN is trained. The CNN performs as a classifier by identifying a person placing a predetermined object on the lap and the type of the object, a person placing a predetermined object on the lap and the type of the object, a person in a predetermined posture and the type of the posture, an object between the driving seat and the rear seat, and a person seating on the rear seat. Another machine learning model such as a support vector machine, a random forest, or the like may be used as the classifier.

The determining unit 231 may determine whether or not the driver 40 is operating the information terminal 50 such as a laptop computer or a high performance portable terminal by detecting whether or not a communication device (not shown) mounted on the vehicle 10 is communicating with the information terminal 50 operated by the driver 40. The communication between the information terminal 50 operated by the driver 40 and the communication device mounted on the vehicle 10 indicates that the driver 40 is operating the information terminal 50. The communication state of the communication device mounted on the vehicle 10 (not shown) with the information terminal 50 operated by the driver 40 is an example of information representing the state of the driver.

The determining unit 231 may also detect that a person seating on the rear seat based on a seating signal input from the seating sensor 8 disposed in the rear seat behind of the driving seat 31. The seating signal is an example of the information representing the state of the rear seat behind the driving seat 31.

The determining unit 231 determines that the seat position of the driving seat 31 on which the driver 40 is seated is not in the displaceable state when the driver is holding an object (such as a drink, food, glasses, or cosmetics, etc.), since the displacement of the seat position may spill or cause an object to fall from the hand.

The determining unit 231 determines that the seat position of the driving seat 31 on which the driver 40 is seated is not in the displaceable state when the driver 40 is placing an object (such as a laptop computer, pet, or luggage, etc.) on the lap, since the object may brake or come in contact with the steering wheel 32 at the time of the moving of the seat position of the driving seat 31 from the automatic control position to the manual control position.

The determining unit 231 determines that the seat position of the driving seat 31 on which the driver 40 is seated is not in the displaceable state when the driver 40 is holding glasses in his hand, is taking off his shoes, is drawing his knees up, is holding a garment in his hand, is operating an information terminal 50 such as a laptop computer, etc. since the driver 40 is not in a state capable of operating the vehicle 10. These are examples of a state in which the driver 40 is not able to operate the vehicle 10, and the driver's state identified by the determining unit 231 may include states other than those describe above.

The determining unit 231 determines that the seat position of the driving seat 31 on which the driver 40 is seated is not in the displaceable state when an object is placed between the driving seat 31 and the rear seat, since the driving seat may come in contact with the object at the time of the moving of the seat position of the driving seat 31 from the manual control position to the automatic control position.

The determining unit 231 determines that the seat position of the driving seat 31 on which the driver 40 is seated is not in the displaceable state when a person is seated on the rear seat, since the driving seat 31 may come in contact with the person seating on the rear seat at the time of the moving of the seat position of the driving seat 31 from the manual control position to the automatic control position.

As described above, the determining unit 231 determines that the seat position of the driving seat 31 on which the driver 40 is seated is not in the displaceable state when the state of the driver 40 or the state of the rear seat corresponds to the above-described cases (step S203—No). The determining unit 231 may determine whether or not the seat position of the driving seat 31 on which the driver 40 is seated can be displaced only based on the information representing the state of the driver 40.

On the other hand, the determining unit 231 determines that the seat position of the driving seat 31 on which the driver 40 is seated is in the displaceable sate when the state of the driver 40 and the state of the rear seat does not correspond to the above-described cases (step S203—Yes).

When the seat position of the driving seat 31 on which the driver 40 is seated is in the displaceable state, the control unit 232 displaces the seat position of the driving seat 31 using the seat drive unit 5 from the position for the automatic control operation to the position for the manual control operation or from the position for the manual control operation to the position for the automatic control operation, (step S204) and the series of processing is complete. The control unit 232 is an exemplary seat position control unit. The control unit 232 determines whether the current seat position of the driving seat 31 is the manual control position or the automatic control position based on information representing the current seat position of the driving seat 31 detected by the seat position detection sensor 6. The control unit 232 displaces the seat position of the driving seat 31 to the automatic control position when the current seat position of the driving seat 31 is the manual control position. On the other hand, the control unit 232 displaces the seat position of the driving seat 31 to the manual control position when the current seat position of the driving seat 31 is the automatic control position.

On the other hand, when the seat position of the driving seat 31 on which the driver 40 is seated is not in the displaceable state (step S203—No), the control unit 232 notifies the driver 40 via UI 9 to displace the seat position of the driving seat 31 from the position for the automatic control operation to the position for the manual control operation or from the position for the manual control operation to the position for the automatic control operation by operating the position operation unit 7, and the series of processing is complete (step S205). The control unit 232 is an exemplary notifying control unit.

The driver 40 places an object on a predetermined place and operates the position operation unit 7 to displace the seat position of the driving seat 31 from the automatic control position to the manual control position or from the manual control position to the automatic control position, when the driver 40 is holding the object (such as a drink, food, glasses, or cosmetics, etc.).

The driver 40 moves an object from the lap and operates the position operation unit 7 to displace the seat position of the driving seat 31 from the automatic control position to the manual control position, when the driver 40 places an object (such as a laptop computer, pet, or luggage, etc.) on his lap.

The driver 40 assumes a ready-to-drive state by wearing the glasses and operates the position operation unit 7 to displace the seat position of the driving seat 31 from the automatic control position to the manual control position, when the driver 40 is not in a state capable of operating the vehicle 10, such as when the driver 40 is holding glasses in his hand, etc.

The driver 40 moves an object between the driving seat 31 and the rear seat and operates the position operation unit 7 to displace the seat position of the driving seat 31 from the manual control position to the automatic control position, when the object is placed between the driving seat 31 and the rear seat.

In addition, the driver 40 may ask a person seating on the rear seat behind of the driving seat 31 to move to another seat when the person is seated on the rear seat. After the person has moved to another seat, the driver 40 may operate the position operation unit 7 to displace the seat position of the driving seat 31 from the manual control position to the automatic control position.

As described above, the seat control device of the present embodiment is capable of displacing the seat position of the driving seat after determining that the seat position of the driving seat is in the displaceable state based on the information representing the state of the driver when the control transfer demand has been made. Thus, the seat control device can reduce the burden on the driver and prevent the seat position of the driving seat from being displaced when the driver does not wish to do so.

Figure 8:
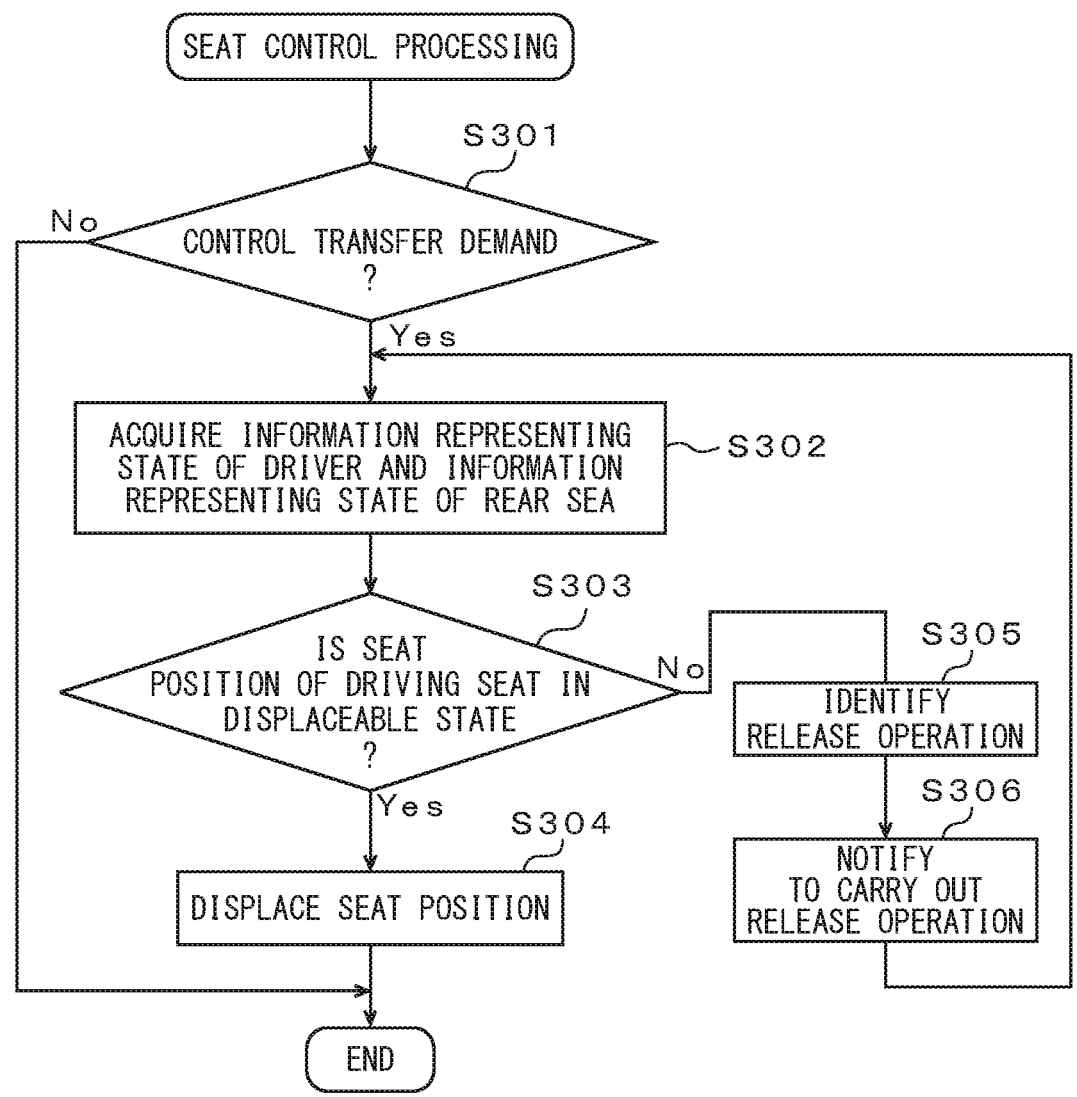
FIG. 8 is another example of an operation flow chart for a seat control processing of the seat control device of the present embodiment.

Next, referring to FIG. 8, a modified example of the seat control device of the present embodiment will be described. FIG. 8 is another example of an operation flow chart for a seat control processing of the seat control device 12 of the present embodiment. The seat control processing shown in FIG. 8 is carried out at the seat control time having a predetermined period.

The processing of the steps S301 to S304 of the operation flow chart shown in FIG. 8 is the same as the steps S201 to S204 described above.

When the seat position of the driving seat 31 is not in the displaceable state, (step S303—No), the classifying unit 233 identifies a release operation by which the seat position of the driving seat 31 becomes the displaceable state based on the information representing the state of the driver 40 and/or the state of the rear seat (step S305).

The classifying unit 233 identifies a release operation by which the seat position of the driving seat 31 becomes the displaceable state based on the state of the driver 40 and/or the state of the rear seat as determined by the determining unit 231. When the driver 40 is holding an object (such as a drink, food, glasses, or cosmetics, etc.) in his hand, the classifying unit 233 identifies placing of the object on the predetermined place as the release operation. When the driver 40 places an object (such as a laptop computer, pet, or luggage, etc.) on his lap, the classifying unit 233 identifies moving of the object from the lap as the release operation. When the driver 40 is not in a state wherein he can operate the vehicle 10, the classifying unit 233 identifies the driver 40 entering a ready-to-drive state as the release operation. Specifically, the classifying unit 233 identifies the driver putting on his shoes as the release operation when the driver 40 had his shoes off. The classifying unit 233 identifies the driver lowering his knees as the release operation when the driver 40 had his knees up. The classifying unit 233 identifies the driver putting on a garment or putting the garment in a specific place as the release operation when the driver 40 had been holding the garment in his hand. The classifying unit 233 identifies the driver 40 stopping the operating of an information terminal such as a laptop computer as the release operation when the driver 40 had been operating the information terminal 50.

The classifying unit 233 identifies the driver 40 moving an object between the driving seat 31 and the rear seat as the release operation when the object had been placed between the driving seat 31 and the rear seat. The classifying unit 233 identifies a person who had been sitting on the rear seat moving to another seat as the release operation when the person moves from the rear seat.

The classifying unit 233 may refer to a table associated with the state of the driver 40 and the rear seat and the release operation to identify a release operation corresponding to the state of the driver 40 or the state of the rear seat. Such a table is stored in the memory 22.

The control unit 232 then notifies the driver 40 via the UI 9 to carry out the release operation identified by the classifying unit 233 (step S306). The control unit 232 uses the UI 9 to notify the driver 40 to carry out the release operation, representing the release operation by text or audio.

The processing then returns to prior to step S302. As the driver 40 carries out the predetermined release operation, the determining unit 231 determines that the seat position of the driving seat 31 on which the driver 40 is seated is in the displaceable state (step S303—Yes). Then, the control unit 232 displaces the seat position of the driving seat 31 using the seat drive unit 5 from the position for the automatic control operation to the position for the manual control operation or from the position for the manual control operation to the position for the automatic control operation, (step S304) and the series of processing is complete.

The seat control device, computer program for controlling a seat and method for controlling a seat according to the embodiments described in the present disclosure may incorporate appropriate modifications that still fall within the gist of the disclosure. Moreover, the technical scope of the disclosure is not limited to these embodiments and includes the invention and its equivalents as laid out in the claims.

For example, the seat control device may ask an approval of the driver by voice via the UI before the seat position of the driving seat is displaced from the manual control position to the automatic control position or from the automatic control position to the manual control position. The seat control device displaces the seat position after confirming the approval of the driver to displace the seat position.

The seat control device may also stop the displacement of the seat when the seat position of the driving seat is displacing from the manual control position to the automatic control position or from the automatic control position to the manual control position, when the driver asks to stop the displacement by voice via the UI. This is because the driver may not want to displace the seat position of the driving seat in some cases. In addition, the seat control device may restart the displacement that has been stopped when it is requested by the driver to release the stopping of displacement.

The seat control device may not displace the seat position of the driving seat from the manual control position to the automatic control position or from the automatic control position to the manual control position according to a request from the driver via the UI. In this instance, the seat control device may confirm an approval of the driver to initiate displacing the seat position automatically via the UI at a confirmation time having a predetermined period.

In the above-described embodiments, the information representing the state of the driver is the monitor image or the communication state of the information terminal operated by the driver, but is not limited thereto. For example, the seating signal output from the seating sensor arranged in the driving seat may be used as the information representing the state of the driver. In this instance, the seating sensor may output a seating signal representing the seating state of the driver by outputting a seating signal that varies according to the magnitude of the pressure.

The invention claimed is:

1. A seat control device comprising:
a processor configured to:
    determine whether a control transfer demand for transferring driving of a vehicle from a manual control operation to an automatic control operation or from the manual control operation to the automatic control operation has been made;
    determine whether a seat position of a seat on which a driver is seated is in a displaceable state based on information representing a state of the driver, the state of the driver indicating at least whether the driver is holding an object;
    displace, based on determining that the control transfer demand has been made and that the seat position is in the displaceable state, the seat position from a position for the automatic control operation to a position for the manual control operation or from the position for the manual control operation to the position for the automatic control operation using a seat drive unit;
    determine, based on determining that the control transfer demand has been made and that the seat position is not in the displaceable state, to both:
        not implement a displacement, of the seat position from the position for the automatic control operation to the position for the manual control operation or from the position for the manual control operation to the position for the automatic control operation, using the seat drive unit, and
        output a request to the driver to implement the displacement; and
    in response to a response from the driver to implement the displacement, implement the displacement.

2. The seat control device of claim 1, wherein the processor is further configured to determine whether the seat position is in the displaceable state based on an image including the driver.

3. The seat control device of claim 1, wherein the processor is further configured to determine whether the seat position is in the displaceable state based on a communication state of an information terminal operated by the driver.

4. The seat control device of claim 1, wherein the processor is further configured to determine whether the seat position is in the displaceable state based on information representing a state of another seat behind the seat on which the driver is seated.

5. The seat control device of claim 1, wherein the processor is further configured to notify the driver to displace the seat position from the position for the automatic control operation to the position for the manual control operation or from the position for the manual control operation to the position for the automatic control operation using a notifying unit when the control transfer demand has been made and the seat position is not in the displaceable state.

6. The seat control device of claim 1, wherein the processor is further configured to identify a release operation based on the information representing a state of the driver when the control transfer demand has been made and the seat position is not in the displaceable state, and notify the driver to operate the release operation.

7. The seat control device according to claim 1, wherein the object is any of a drink, a food, glasses, and cosmetics, and determining whether the seat position of the seat on which the driver is seated is in the displaceable state based on information representing the state of the driver comprises determining that the seat position is not in the displaceable state based on determining that the driver is holding the object.

8. The seat control device according to claim 1, wherein the object is a laptop, and determining whether the seat position of the seat on which the driver is seated is in the displaceable state based on information representing the state of the driver comprises determining that the seat position is not in the displaceable state based on determining that the driver is any of placing an object on a lap of the driver and operating the object.

9. The seat control device according to claim 1, wherein the object is any of shoes and knees of the driver, and determining whether the seat position of the seat on which the driver is seated is in the displaceable state based on information representing the state of the driver comprises determining that the seat position is not in the displaceable state based on determining that the driver is any of taking off the shoes and drawing up the knees.

10. The seat control device according to claim 1, wherein the seat position comprises a tilt angle of a seat back of the seat.

11. The seat control device according to claim 1, wherein the processor is further configured to implement the displacement, in response to the response from the driver to implement the displacement, in a state in which the processor has determined that the seat position is not in the displaceable state.

12. The seat control device according to claim 1, wherein the displacement is of the seat position is from the position for the manual control operation to the position for the automatic control operation.

13. The seat control device according to claim 1, wherein displacing, based on determining that the control transfer demand has been made and that the seat position is in the displaceable state, the seat position from the position for the automatic control operation to the position for the manual control operation or from the position for the manual control operation to the position for the automatic control operation using the seat drive unit comprises:

displacing the seat position from the position for the manual control operation to the position for the automatic control operation.

14. The seat control device according to claim 1, wherein the object is a laptop, and the processor is further configured to determine that the seat position is not in the displaceable state based on determining that the state of the driver is at least that the driver is any of placing the laptop on a lap of the driver and operating the laptop.

15. The seat control device according to claim 1, wherein the object is any of shoes and knees of the driver, and the processor is further configured to determine that the seat position is not in the displaceable state based on determining that the state of the driver is at least that the driver is any of taking off the shoes and drawing up the knees.

16. A computer-readable, non-transitory storage medium storing a computer program for controlling a seat, which causes a processor to execute a process, the process comprising:

determining whether a control transfer demand for transferring driving of a vehicle from a manual control operation to an automatic control operation or from the manual control operation to the automatic control operation has been made;

determining whether a seat position of a seat on which a driver is seated is in a displaceable state based on information representing a state of the driver, the state of the driver indicating at least whether the driver is holding an object;

displacing, based on determining that the control transfer demand has been made and that the seat position is in the displaceable state, the seat position from a position for the automatic control operation to a position for the manual control operation or from the position for the manual control operation to the position for the automatic control operation using a seat drive unit;

determining, based on determining that the control transfer demand has been made and that the seat position is not in the displaceable state, to both:

not implement a displacement, of the seat position from the position for the automatic control operation to the position for the manual control operation or from the position for the manual control operation to the position for the automatic control operation, using the seat drive unit, and output a request to the driver to implement the displacement; and in response to a response from the driver to implement the displacement, implementing the displacement.

17. A method for controlling a seat carried out by a seat control device, and the method comprising:

determining that a control transfer demand for transferring driving of a vehicle from a manual control operation to an automatic control operation or from the manual control operation to the automatic control operation has been made;

determining that a seat position of a seat on which a driver is seated is in a displaceable state based on information representing a state of the driver, the state of the driver indicating at least whether the driver is holding an object;

displacing, based on determining that the control transfer demand has been made and that the seat position is in the displaceable state, the seat position from a position for the automatic control operation to a position for the manual control operation or from the position for the manual control operation to the position for the automatic control operation using a seat drive unit;

determining, based on determining that the control transfer demand has been made and that the seat position is not in the displaceable state, to both:

not implement a displacement, of the seat position from the position for the automatic control operation to the position for the manual control operation or from the position for the manual control operation to the position for the automatic control operation, using the seat drive unit; and output a request to the driver to implement the dis-
placement; and
in response to a response from the driver to implement the
displacement, implement the displacement.

\* \* \* \* \*